United States Patent
Shimada et al.

[11] Patent Number: 5,108,331
[45] Date of Patent: Apr. 28, 1992

[54] METHOD FOR MANUFACTURING SMALL TUBULAR LAMPS

[75] Inventors: Hiroharu Shimada, Yokohama; Yasuhisa Yaguchi, Yamato; Masaaki Muto, Kawasaki, all of Japan

[73] Assignee: Stanley Electric Co., Ltd., Tokyo, Japan

[21] Appl. No.: 744,364

[22] Filed: Aug. 13, 1991

[30] Foreign Application Priority Data

Aug. 17, 1990 [JP] Japan ............ 2-216521
Jul. 12, 1991 [JP] Japan ............ 3-197314

[51] Int. Cl.⁵ .................................. H01J 9/00
[52] U.S. Cl. .................................. 445/3; 65/109; 65/160; 445/26; 445/22
[58] Field of Search ............ 445/26, 22, 3; 65/108, 65/109, 110, 160, 163, 164, 162

[56] References Cited

U.S. PATENT DOCUMENTS

| | | | |
|---|---|---|---|
| 3,263,852 | 8/1966 | Fridrich | 445/26 X |
| 3,305,289 | 2/1967 | Fridrich | 445/26 X |
| 3,576,611 | 4/1971 | Obersby | 65/109 X |
| 3,679,385 | 7/1972 | Senft | 65/109 X |
| 3,685,880 | 8/1972 | Sobieski | 445/26 |
| 4,389,201 | 6/1983 | Hansler et al. | 445/26 |
| 4,675,043 | 6/1987 | Conta et al. | 65/160 |

*Primary Examiner*—Kenneth J. Ramsey
*Attorney, Agent, or Firm*—Frishauf, Holtz, Goodman & Woodward

[57] ABSTRACT

In a method for manufacturing small tubular lamps, a moving amount of a tube stock is adjusted according to a wall thickness thereof to make the stock-guide amount uniform, and the internal pressure during the stock-guide step is also adjusted so as to produce a suitable dimension of the outside diameter thereof, whereby the working amount in the succeeding step is reduced to decrease errors in dimensional tolerances, particularly in wall thickness and internal volume.

5 Claims, 3 Drawing Sheets

METHOD FOR MANUFACTURING SMALL TUBULAR LAMPS

BACKGROUND OF THE INVENTION

1. Field of the Invention

The present invention relates to a method for manufacturing small tubular lamps used for discharge lamps such as small metal halide lamps.

2. Description of the Prior Art

In manufacturing a small tubular lamp, for example, as shown in FIGS. 4 and 5, a tube stock a formed of glass, quartz, etc. is set on a glass lathe or a working device provided with a function similar to that of the glass lathe. At least one of left and right collets (bearings) is moved by a predetermined amount toward the center, while heating the tube stock a by a burner b in a rotating state, whereby padding is gathered on a predetermined portion of the tube stock a.

Then, the tube stock a is fully heated and made molten, and thereafter the predetermined portion of the tube stock a is covered with a mold c for blow molding. A predetermined pressure is applied into the tube stock a to inflate and suitably shape the tube stock a.

In metal vapor discharge lamps such as metal halide lamps, vapor pressure of a luminous material sealed into a luminous tube greatly influences the output, light color, etc. Therefore, it is desirable to minimize unevenness between individuals luminous tubes. Because of this, it is demanded in the process of manufacturing a luminous tube that dimensions of various parts, volumes, etc. need to have reproducibility with high precision.

Particularly, in a metal halide lamp whose power consumption is low (specifically, 100 W or less), severe improvement in precision is demanded with the trend of smaller types. The aforementioned conventional manufacturing method is not absolutely fulfilled with the aforesaid demand. Despite the fact that for example, a demand for a headlamp for an automobile or the like of which power consumption is low is anticipated, yield is poor and cost is high, thus posing a problem in that they cannot be sufficiently supplied to the market.

It is an object of the present invention to provide a method for manufacturing small tubular lamps capable of molding small tubular lamps with high working precision and with low cost.

SUMMARY OF THE INVENTION

For solving the aforementioned problems, the present invention provides a method for manufacturing small tubular lamps comprising the steps of forming a stock-guide by heating and melting a predetermined portion of a tube stock while rotating the tube stock about an axis of the tube and moving a tube end toward the center to form a stock-guide portion, and molding by reheating and melting said stock guide and forming it into a predetermined shape by a mold, characterized in that said stock-guide forming step adjusts a moving amount of the tube end toward the center according to a sectional area of said tube stock so that a glass volume of the stock guide portion is constant and applies internal pressure higher than suitable atmospheric pressure in a range of 2 to 6 mmHg into said tube stock to maintain an outside diameter of the center of said stock guide portion substantially constant, and said molding step is carried out by forming a female shape in a completed state in the end of a disk, placing a roller movable in a diametrical direction of said tube stock in pressure contact with said reheated and molten stock guide portion and rotating said tube stock until said roller reaches a predetermined position. With the above-described manufacturing method, precision in the manufacture process is improved to solve the aforesaid problem.

DESCRIPTION OF THE PREFERRED EMBODIMENTS

Figure 1:
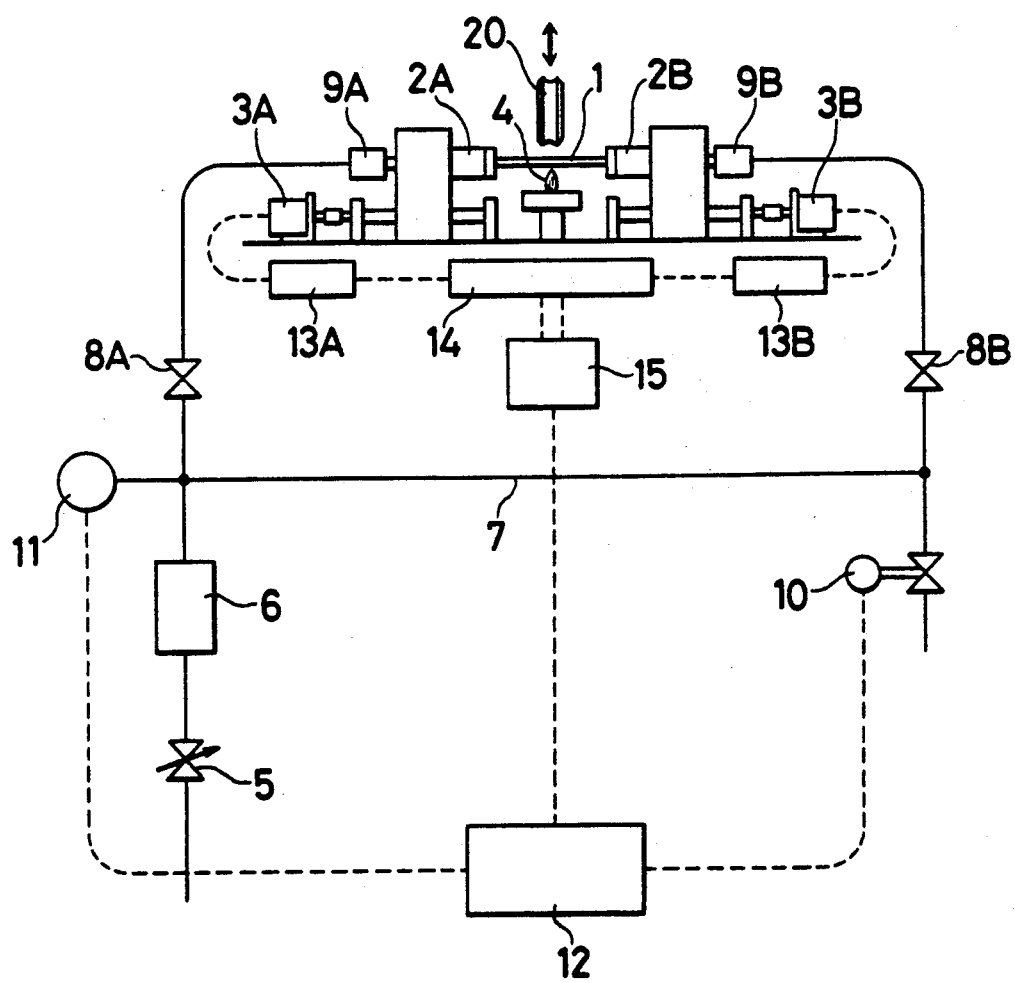
FIG. 1 shows an inert gas piping system and control circuit showing one embodiment of a method for manufacturing a small tubular lamp according to the present invention.

The present invention will be described hereinafter by way of an embodiment shown in the drawings.

In FIG. 1, reference numeral 1 designates a tube stock. Opposite ends of the tube stock (a glass tube, a quartz tube, etc.) I are airtightly held by collets 2A and 2B. The collets 2A and 2B can be moved by a suitable distance in an axial direction of the glass tube 1 by pulse motors 3A and 3B. A burner 4 is arranged in the middle between the collets 2A and 2B.

In FIG. 1, the solid line indicates piping of inert gas, and the dash line indicates an electrical wiring. The inert gas flows through a needle valve 5 and a flow meter 6 and is branched into a direction of the glass tube 1 and a direction of a bypass 7. A valve 8A and a coupler 9A are interposed between a branch point (inlet of the bypass 7) and one end of the glass tube 1. The inert gas is once branched to bypass 7 and passes through respective flowpassages, after which the gases are again joined together. The joined gases are discharged passing through a variable valve 10 with an actuator. A fine differential pressure gauge 11 is provided at the aforesaid branch point.

The fine differential pressure gauge 11 measures a pressure difference between the atmospheric pressure and inert gas line, and the measured signal is supplied to a PID control unit 12. The PID control unit 12 drives the variable valve 10 according to a difference between a preset pressure and an actual pressure and is operated so as to maintain the pressure of the inert gas line constant.

The pulse motors 3A and 3B are driven by drivers 13A and 13B which receive an output pulse of a pulse oscillator 14. The pulse oscillator 14 is controlled by a microcomputer 15.

Figure 2:
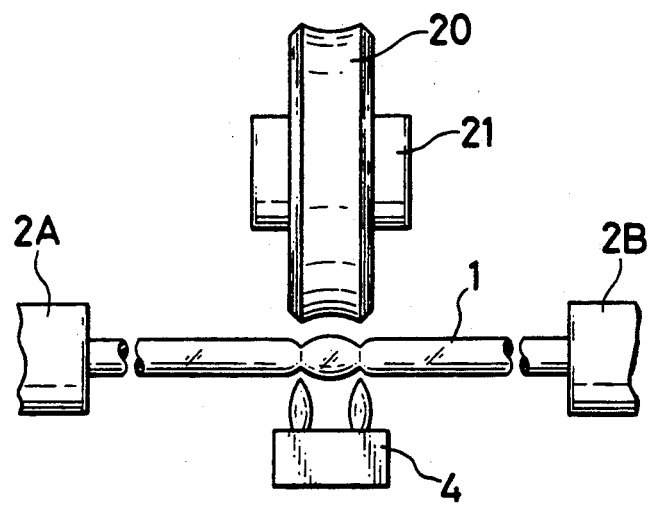
FIG. 2 is a front view in an enlarged scale showing principal parts of the embodiment shown in FIG. 1.
Figure 3:
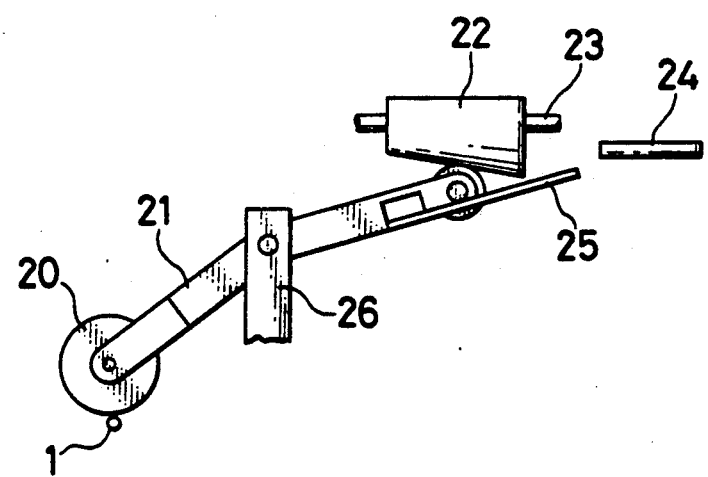
FIG. 3 is a side view in an enlarged scale showing principal parts shown in FIG. 1.

In FIG. 1, reference numeral 20 designates a roller. The roller 20 is provided for the molding step applied to the tube stock 1, the structure of the roller 20 being shown in detail in FIG. 2 and FIG. 3. Above the tube stock 1 is rotatably supported, by an arm 2., a disk-like roller 20 formed of carbon or the like and formed at an end with a female shape (see FIG. 2 in a completed state of a tubular lamp as an object. The arm 21 is rotated about a fulcrum provided in a column 26 according to a position of a cam 22 driven by a bowl screw 23 to displace the roller 20 along the diametric direction of the tube stock 1. A position detection bar 25 is provided on the arm 21, and a position sensor 24 is actuated when the position detection bar 25 reaches a predetermined position to notify that state.

The method for manufacturing a small tubular lamp according to the present invention will be described hereinafter in accordance with the following sequential steps.

(1) Premeasured inside diameter and outside diameter of the glass tube 1 are inputted into a microcomputer (micon) 15.

(2) The micon 15 computes adequate stock-guide amount and pressure in the glass tube 1 from a sectional area of the glass tube 1.

(3) Upon receipt of command from the micon 15, the PID control unit 12 manipulates the variable valve 10 to stabilize the inert gas line at computed pressure in the range of 2 to 6 mmHg.

(4) After the glass tube 1 has been molten by the burner 4, the pulse oscillator 14 is actuated in accordance with the command of the micon 15, and the computed number of pulse signals are sent to the drivers 13A and 13B to drive the pulse motors 3A and 3B. Thereby, the collets 2A and 2B are moved by the computed distance in the direction of the center, whereby the stock-guide step is executed and next, the molding step proceeds (5) A predetermined portion of the tube stock 1 is again heated and made molten, and the cam 22 is driven to move down the roller 20, which is placed in pressure contact with the tube stock 1 by its own weight.

(6) A position of the roller 20 is detected by the position detection bar 25, and the step (5) above is repeated until the roller 20 reaches a predetermined position.

(7) Upon termination of the aforesaid steps, a portion in contact with the roller 20 is re-heated to remove distortion.

The function and effects of the method for manufacturing small tubular lamps using the above-described steps according to the present invention will be described hereinafter.

(1) First, the stock-guide amount is adjusted by the stock-guide step according to a sectional area of the tube stock 1, whereby a volume of glass material of a portion formed as a luminous tube can be maintained constant by the succeeding step.

(2) At that time, an internal pressure of the tube stock 1 is set to an adequate pressure within the range of 2 to 6 mmHg, whereby the outside diameter of the center portion of the stock-guide portion can be maintained substantially constant and substantially equal to the outside diameter of the tubular lamp to be completed by the succeeding step.

(3) Furthermore, the outside diameter of the center portion is made substantially constant and equal in the outside diameter to that of the completed state as described above, whereby the molding step by the roller 20 is to have its object principally for arranging the shape. The working amount decreases, and therefore the lowering of the accuracy in the molding step can be reduced. By the functions described in the above paragraphs (1) to (3), excellent dimensional accuracy and tubular lamps excellent in standardization of shapes are obtained.

Table 1 shows specific measured values of a center outside diameter, a center inside diameter and an internal volume of tubular lamps which are extremely small. Such tubular lamps for discharge are called a double end type have a center outside diameter of 6 mm and a length of tube of 7.5 mm except a seal portion manufactured by the method according to the present invention. A dimension tolerance in the center outside diameter is 0.03 mm, and particularly, a dimension tolerance even in the center inside diameter is 0.07 mm which has been heretofore considered to be difficult to obtain. Uniformity with such high precision can be realized with the present invention. As a result, an internal volume which is an integrated value of the respective dimensional accuracy is also $1.8 \times 10^{-3}$ cc. Thus, the dimensions of various portions are uniformly formed with extremely high accuracy. It is therefore readily assumed that a discharge lamp, for example, such as a metal halide lamp which employs a tubular lamp produced by use of the present invention, also has a high uniformity.

TABLE 1

| Materials No. | Center outside diameter (mm) | Center inside diameter (mm) | Internal volume ($\times 10^{-3}$ cc) |
|---|---|---|---|
| 1 | 6.01 | 2.99 | 29.7 |
| 2 | 6.03 | 3.02 | 30.5 |
| 3 | 6.00 | 2.99 | 29.4 |
| 4 | 6.03 | 3.06 | 31.2 |
| 5 | 6.02 | 3.02 | 30.2 |

As described above, according to the present invention, the stock-guide amount is adjusted according to a sectional area of a tube stock, and in addition, suitable internal pressure is applied during the stock-guide step so that the outside diameter may have a predetermined dimension, whereby the working amount in the succeeding working step can be extremely reduced to render possible molding a tubular lamp with high accuracy, and unevenness of the lamp characteristics can be reduced. Accordingly, small metal halide lamps can be used even for uses which have been heretofore difficult to be applied. Moreover, the stock-guide position, stock-guide amount, pressure difference between inside and outside of a tube stock, etc. can be controlled by a microcomputer to thereby freely mold any dimension and shape. Furthermore, the dimensional allowance of the tube stock is improved, and selection of materials becomes unnecessary. Tubular lamps can be produced with low cost.

What is claimed is:

1. A method for manufacturing small tubular lamps, comprising:

forming a stock-guide by heating and melting a predetermined portion of a glass tube stock while rotating the tube stock about an axis of the tube stock and moving an end portion of the tube stock toward the center of the tube stock to form a stock-guide portion; and molding by re-heating and melting said stock-guide portion and forming it into a predetermined shape by a mold;

said step of forming a stock-guide comprising:

adjusting a moving amount of the tube-stock end toward the center of the tube stock as a function of a sectional area of said tube stock so that a glass volume of the stock guide portion is substantially constant; and applying an internal pressure higher than atmospheric pressure in a range of 2 to 6 mmHg into said tube stock to maintain an outside diameter of a center portion of said stock-guide portion substantially constant; and said molding step comprises:

forming a female shape, corresponding to a completed state of the lamp, in the end of a roller;

placing said roller, movable in a diametrical direction of said tube stock, in pressure contact with said reheated and molten stock-guide portion; and rotating said tube stock until said roller reaches a predetermined position in contact with said reheated and molten stock-guide portion to shape said stock-guide portion.

2. The method of claim 1, wherein said tube stock comprises a glass tube.

3. The method of claim 1, wherein aid tube stock comprises a quartz tube.

4. The method of claim 1, wherein said molding is carried out by a roller having said female shape on a circumferential surface thereof.

5. The method of claim 1, wherein said tube stock is heated and re-heated by a burner.

* * * * *

UNITED STATES PATENT AND TRADEMARK OFFICE
CERTIFICATE OF CORRECTION

Figure 4:
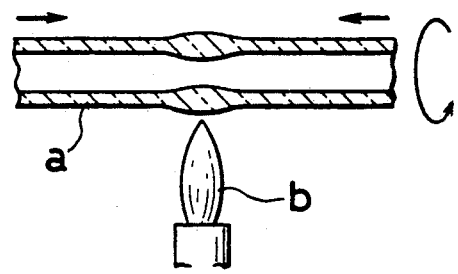
FIG. 4 illustrates a conventional step of forming a stock-guide.
Figure 5:
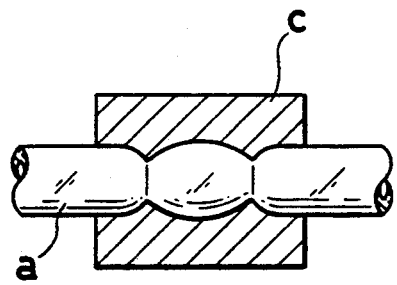
FIG. 5 illustrates a conventional molding step.

PATENT NO. : 5,108,331
DATED : April 28, 1992
INVENTOR(S) : SHIMADA et al It is certified that error appears in the above-identified patent and that said Letters Patent is hereby corrected as shown below:

In the Drawing, Sheet 3, Next to Figs. 4 and 5, insert --PRIOR ART--.

Column 2, line 35, before "electrical" delete "an".

Column 2, line 65, after "(see FIG.2", insert -- ) --.

Column 3, line 16, following "receipt of", insert --a--.

Column 3, line 18, following "gas line at", insert --a--.

Column 3, line 20, following "has been", insert --made--.

Column 4, line 44, following "and", insert --special--.

Column 6, line 5 (claim 3), replace "aid" with --said--.

Signed and Sealed this

Twenty-sixth Day of October, 1993

Attest:

BRUCE LEHMAN

Attesting Officer

Commissioner of Patents and Trademarks